No. 840,206. PATENTED JAN. 1, 1907.
J. GASS.
ANIMAL TRAP.
APPLICATION FILED SEPT. 20, 1906.
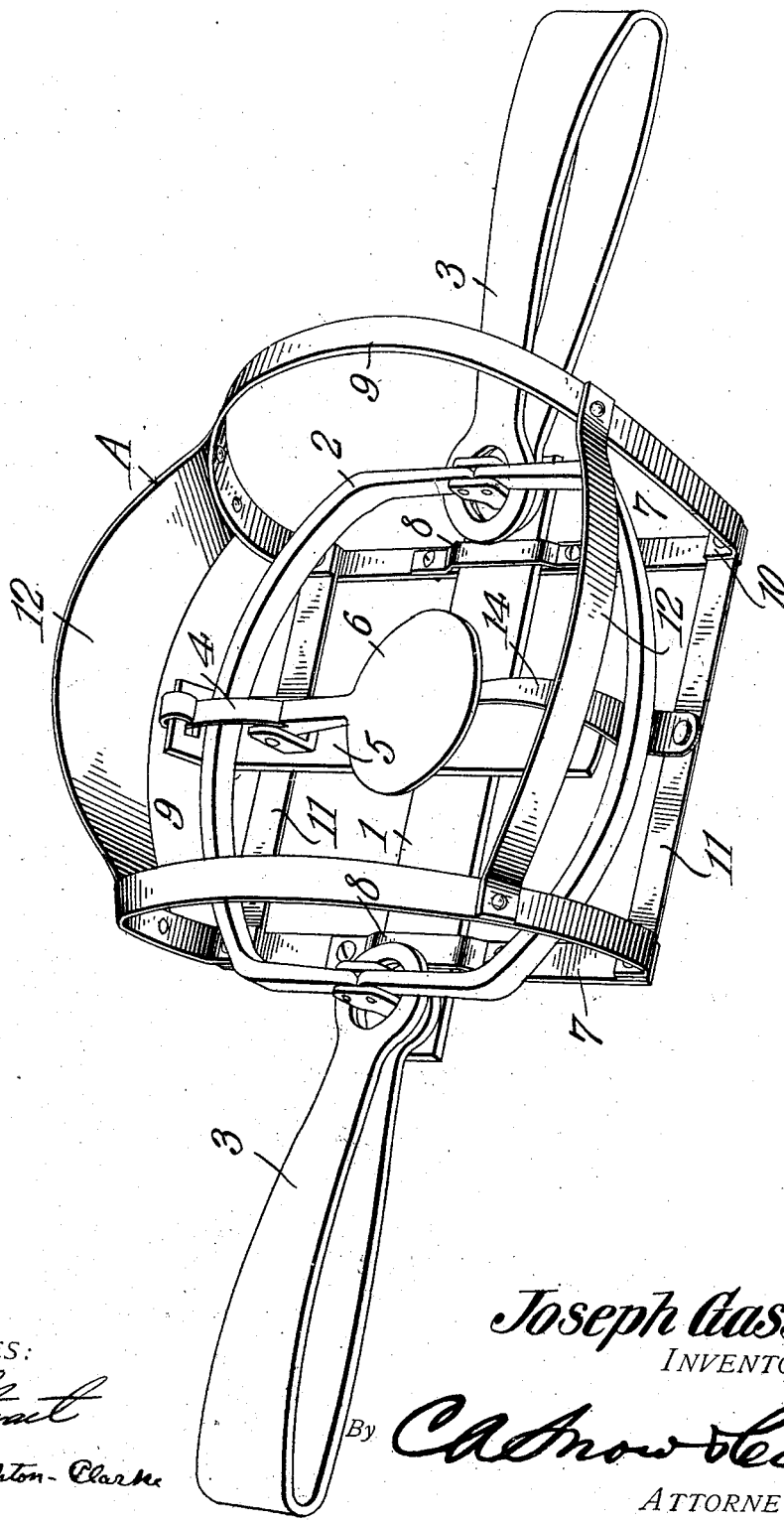
WITNESSES:
Joseph Gass,
INVENTOR.
ATTORNEYS

UNITED STATES PATENT OFFICE.

JOSEPH GASS, OF PORTLAND, OREGON.

ANIMAL-TRAP.

No. 840,206. Specification of Letters Patent. Patented Jan. 1, 1907.

Application filed September 20, 1906. Serial No. 335,472.

*To all whom it may concern:*

Be it known that I, JOSEPH GASS, a citizen of the United States, residing at Portland, in the county of Multnomah and State of Oregon, have invented a new and useful Animal-Trap, of which the following is a specification.

This invention relates generally to animal-traps, and particularly to such traps as are intended for catching beaver.

The trapping of beaver is attended with a number of difficulties. In the first place, the animals sometimes spring a delicate trap by throwing water on the releasing-pan with their tails; in the second place, a beaver sometimes springs a trap by rubbing its belly over the releasing-pan, and, in the third place, the young beavers spring the traps at times and are caught before they are of any value, for which reason the trappers lose in the long run by destroying a large number of beavers at an early age.

The objects of the present invention are to improve the construction of animal-traps in such manner as to prevent them from being released by anything except the foot of a full-sized animal.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawing, forming part of this specification, the figure is a perspective view of a trap constructed in accordance with the present invention.

The improvements of the present invention have been illustrated in connection with an ordinary form of animal-trap comprising a base-plate 1, with which is pivotally connected a pair of jaws 2, which are adapted to be thrown closed by means of springs 3 and which are held in opened position by means of a pawl 4, pivotally mounted upon one end of a cross-piece 5 and adapted to be engaged by a releasing device or pan 6, which is also pivotally connected with the cross-piece 5 in an old and well-known manner.

In carrying out the present invention a trap of the general character above described is provided with a skeleton guard, (indicated generally by A,) which surrounds the releasing-pan 6 in such manner as to prevent the same from being operated by anything except the foot of an animal. The guard A, which is detachably secured to the trap in any suitable manner, so that it can be removed whenever it is desired to use the trap in the ordinary manner, preferably consists of end cross-pieces 7, which extend under the base-plate 1 and are detachably secured thereto by means of brackets 8, having readily-removable bolts or screws. The brackets 8 constitute the sole means of connection between the guard A and the base-plate 1 of the trap, so that by removing said brackets the entire guard can be easily and quickly detached from the trap.

Extending upward from each of the end cross-pieces 7 is an approximately U-shaped loop 9, the size of which is sufficient to cause it to be out of contact with the jaws even when they swing into closed position under the action of the springs 3. The loops 9 at their lower ends are formed with inwardly-bent flanges 10, which rest upon the lower side bars 11 of the trap and are suitably bolted thereto, said side bars 11 being arranged in parallelism with the base-plate 1. In addition to the lower side bars 11 the guard A is provided with a pair of upper curved side bars 12, which are connected at their opposite ends with the loops 9, as shown, so as to form a barrier or fence around the releasing-pan 6. The loops 9, together with the curved side bars 12, prevent an animal from releasing the trap by rubbing lightly over the releasing device 6 and render it necessary for an animal to place its foot squarely upon the releasing device in order to spring the trap. For the twofold purpose of preventing the trap from being released either by means of water flung upon it by the tail of a beaver or by a young beaver a flat spring 14 is secured to one of the side bars 11 on the side of the guard opposite the pawl 4, said spring 14 being adapted to bear upwardly against the under surface of the releasing device 6 with sufficient pressure to prevent said releasing device from being moved downward by anything except the foot of a full-grown animal. It will be obvious that the spring 14 is connected with the guard A and will therefore be removable from the trap when said guard is detached.

The improved trap of the present invention is strong, simple, durable, and inexpensive in construction, as well as thoroughly efficient in operation.

What is claimed is—

1. A trap having a releasing device, and a skeleton guard surrounding the releasing device.

2. A trap comprising swinging jaws, a releasing device, and a skeleton guard surrounding the releasing device, the ends of the jaws projecting through the ends of the guard.

3. A trap comprising swinging jaws, a releasing device and a guard at opposite sides of the jaws and surrounding the releasing device, the ends of the jaws projecting through the ends of the guard.

4. A trap having swinging jaws, a releasing device, a skeleton guard at opposite sides of the jaws and surrounding the releasing device, the ends of said jaws projecting through the ends of the guard.

5. A trap having a releasing device, a detachable guard surrounding the releasing device, and a spring carried by the guard and acting upon the releasing device, said spring being detachable with the guard.

6. A trap having a pair of jaws, a releasing device for controlling said jaws, and a guard surrounding said releasing device and jaws and comprising a pair of end loops and a pair of side bars.

7. In a trap, the combination with a base-plate, a pair of jaws pivotally mounted on said base-plate, a pair of springs for operating said jaws, a cross-piece, a pawl pivotally connected with said cross-piece and a releasing device pivotally connected with said cross-piece and adapted to be engaged by said pawl for holding said jaws in opened position, of a guard comprising a pair of end cross-pieces, brackets detachably secured to said end cross-pieces and embracing said base-plate, lower side bars connecting said end cross-pieces, approximately U-shaped loops secured to said end cross-pieces and lower side bars, curved upper side bars connecting said loops, and a spring secured to one of said lower side bars and bearing upward against the lower surface of said releasing device, for substantially the purposes set forth.

In testimony that I claim the foregoing as my own I have hereto affixed my signature in the presence of two witnesses.

JOSEPH GASS.

Witnesses:
M. B. KEEFER,
T. M. LEABO.